United States Patent
O'Neil et al.

(10) Patent No.: US 9,674,932 B1
(45) Date of Patent: Jun. 6, 2017

(54) DUAL SENSOR LIGHTING CONTROLLER WITH 1-BUTTON REMOTE CONTROL

(71) Applicant: EPtronics, Inc., Gardena, CA (US)

(72) Inventors: Tom O'Neil, Gardena, CA (US); Lee Chiang, Sylmar, CA (US)

( * ) Notice: Subject to any disclaimer, the term of this patent is extended or adjusted under 35 U.S.C. 154(b) by 0 days.

(21) Appl. No.: 15/200,982

(22) Filed: Jul. 1, 2016

(51) Int. Cl.
*H05B 37/00* (2006.01)
*H05B 37/02* (2006.01)

(52) U.S. Cl.
CPC ..... *H05B 37/0272* (2013.01); *H05B 37/0218* (2013.01); *H05B 37/0227* (2013.01); *H05B 37/0281* (2013.01)

(58) Field of Classification Search
CPC ............ H05B 37/0272; H05B 37/0218; H05B 37/0227; H05B 37/0281
USPC .............................. 315/158, 200 R, 293, 307
See application file for complete search history.

(56) References Cited

U.S. PATENT DOCUMENTS

| | | | |
|---|---|---|---|
| 5,189,393 A | 2/1993 | Hu | |
| 6,888,323 B1 | 5/2005 | Null et al. | |
| 7,155,317 B1 | 12/2006 | Tran | |
| 7,411,489 B1 | 8/2008 | Elwell et al. | |
| 7,791,282 B2 | 9/2010 | Yu et al. | |
| 8,373,125 B2 | 2/2013 | Ni et al. | |
| 8,587,415 B1 | 11/2013 | Followell | |
| 8,844,361 B2 | 9/2014 | Joyce | |
| 8,901,496 B2 | 12/2014 | Aurongzeb et al. | |
| 2010/0225240 A1* | 9/2010 | Shearer | H05B 37/0263 315/247 |
| 2011/0193491 A1* | 8/2011 | Choutov | H05B 33/0803 315/291 |
| 2014/0125234 A1 | 5/2014 | Sadwick | |
| 2015/0276266 A1* | 10/2015 | Warren | H04W 4/005 700/300 |

* cited by examiner

*Primary Examiner* — Daniel D Chang
(74) *Attorney, Agent, or Firm* — Clement Cheng

(57) ABSTRACT

A dual sensor lighting controller has an AC input rectifier that includes an EMI filter, and an isolated AC-to-DC converter for 12 VDC and 5 VDC supplies, and a mechanical relay to control output AC Line voltage for the lighting device. The lighting controller also includes a motion PIR sensor, an internal photo sensor, an external photo sensor and an infrared receiver configured to receive signals from a remote control. The remote control is a handheld battery operated infrared remote control. Two wires provide 0-10 VDC dimming and a microcontroller preferably includes proprietary firmware controls. The microcontroller is connected to and reads PIR, internal or external photo sensors signals. The microcontroller has a clock that counts internal timing to control an output of the lighting device by a mechanical relay together with 0-10 VDC dimming control to save Electrical energy by activating or deactivating the output AC Line voltage.

13 Claims, 3 Drawing Sheets

DUAL SENSOR LIGHTING CONTROLLER WITH 1-BUTTON REMOTE CONTROL

FIELD OF THE INVENTION

The present invention is in the field of dual sensor lighting controllers.

DISCUSSION RELATED ART

There are a variety of different United States patents that describe lighting controllers, the disclosures of which are incorporated herein by reference.

For example, U.S. Pat. No. 8,901,496, titled Overhead Occupancy Sensor by General Electric Co., claims a motion sensor with a mechanical height adjustment setup for improved motion detection. This invention does not have infrared motion and photo sensors or an infrared remote control.

U.S. Pat. No. 8,844,361 titled Ultrasonic Sensor Control System for Occupany Sensing by Watt Stopper is another example. This patent claims an ultrasonic motion detector system with no infrared motion and photo sensors, and no infrared remote control.

Another example is presented in U.S. Pat. No. 8,373,125, titled Occupancy Detector Switch by Mtlc Electric, which claims an infrared motion sensor with mechanical relay to turn ON or OFF an AC power source for the connected lighting devices. This device does not have an infrared remote control.

Hubbell Inc. claims a Motion Sensor Switch for 3-Way Light Circuit and Method of Lighting Control Using the Same, U.S. Pat. No. 7,791,282. This invention is a 3-way light circuit that can be controlled at 2 locations, with an added motion sensor function. This device does not have an OR remote control capable of 1-button programming.

U.S. Pat. No. 7,411,489, titled Self-Adjusting Dual Technology Occupancy Sensor System and Method by Cooper Wiring Devices Inc., is another example. This invention claims a dual sensor system with Infrared and Ultrasonic technologies that is capable of self adjusting sensitivities.

Another example is claimed in U.S. Pat. No. 7,155,317, titled Occupant Counter Control Switch for Automatic Turning On and Off Electrical Appliances, by Nhan Tran. Watt Stopper Inc. claims a Light Management System Device and Method in U.S. Pat. No. 6,888,323. This invention comprises a wall switch unit fitted with a light sensor, motion sensor and night sensor. This device does not have an IR remote control. Watt Stopper Inc. also claims a Dual Technology Motion Sensor in U.S. Pat. No. 5,189,393. This invention comprises a dual sensors system with infrared and ultrasonic motion detection. This device does not have an IR remote control.

United States Patent Publication Number 2014/0125234, titled Dimmer with Motion and Light Sensing AC Phase Dim is another example. This patent claims a motion sensor and a Infrared sensor, with AC Phase cut and 0-10 VDC analog dimming control system. This invention also does not have an infrared remote control.

Another example is found in U.S. Pat. No. 8,587,415, titled Receiving and IR Control Signal Through a Fresnel Lens of Motion sensor, by Ixys. This invention comprises a wall mounted Infrared motion sensor, with AC Phase cut TRIAC dimmer and a handheld IR remote control. The handheld IR remote control can only control the TRIAC dimmer, not the sensor programming values.

Unfortunately, many sensor lighting control systems have (dual in-line package) DIP switches, or Potentiometers (POTs) or other manual adjustment apparatus to adjust the default settings for specific applications. However, these systems with manual adjustment are very inconvenient when the system is installed high above on the ceilings, building side walls or lighting poles. If any adjustments are necessary after the installation the installer needs to use a lift device or ladder to reach the manual adjustments. The installer then needs to descend back to floor level to verify proper settings. This procedure may need to be repeated multiple times and is very inconvenient. A remote control unit is very desirable for this situation to eliminate the tedious and costly process of manual adjustments, but oftentimes becomes yet another cryptic enigma. Also, in some other sensor lighting control systems on the markets with sealed enclosure suitable for outdoor wet or damp application, the DIP Switch and POT are not accessible for manual adjustment. Wet area enclosures are required to have accessible compartments with weather proof sealed covers.

SUMMARY OF THE INVENTION

A dual sensor lighting control system has a built-in Passive Infrared (PIR) sensor and a built-in internal Photo sensor. A stand alone external Photo sensor assembly can be plugged in to redirect the photo sensing direction to any desired orientation. A 28 key handheld Infrared (IR) remote control transmitter is also included to communicate and program the lighting controller settings for specific applications with a single button push. The lighting controller output is AC LINE power switched by a mechanical relay, and includes industrial standard 2-wire 0-10 VDC dimming. Any industrial lighting fixtures, LED drivers or fluorescent lamp ballasts with compatible 0-10 VDC dimming can be programmed at 50% dimming level or lower to comply with current standards such as the California Title 24 2013 Building Energy Efficiency Standard.

The IR remote control has a unique feature of single button programming, which reduces the complex programming sequence with a new idea of single button activation. The system can be set for desired operation in most applications with just a single button activation.

A sensor lighting control system with remote control can resolve the above adjustment difficulties. Most common sensor lighting control system local remote controls are either radio Frequency (RF) or Infrared (IR). The RF remote control signal is wide angle signal and it could affect any nearby units which are not targeted for adjustments. The IR remote control has a narrow angle direct line-of-sight signal, so that only the unit intended to be adjusted will receive proper IR signal and be adjusted accordingly. The IR remote control output power is reduced to avoid bouncing outside of aimed angle, so that only the unit intended to be adjusted will receive proper IR signal and be adjusted accordingly. In the present invention, all of the most common commands are presented on the array of buttons on the IR remote control in a single button push action.

A dual sensor lighting controller has an AC input rectifier that includes an EMI filter, and an isolated AC-to-DC converter for 12 VDC and 5 VDC supplies, and a mechanical relay to control output AC Line voltage for the lighting device. The lighting controller also includes a motion PIR sensor, an internal photo sensor, an external photo sensor and an infrared receiver configured to receive signals from a remote control. The remote control is a handheld battery operated infrared remote control.

Two wires provide 0-10 VDC dimming and a microcontroller preferably includes proprietary firmware controls. The microcontroller is connected to and reads PIR, internal or external photo sensors signals. The microcontroller has a clock that counts internal timing to control an output of the lighting device by a mechanical relay together with 0-10 VDC dimming control to save Electrical energy by activating or deactivating the output AC Line voltage.

The microcontroller is connected to and reads the infrared signal received from the infrared receiver and interpret the received code into most common and popular programming needs which has greatly simplified the infrared handheld remote control method into a single button programming technique. The remote control has seven groups of commands, namely: power control, motion detector PIR sensitivity control, motion detector PIR standby time control, ambient light threshold control, dimming level control, dimming time control, quick test control. The remote control has 28 buttons in a 4×7 grid. The remote control operates with a narrow angle less than five degrees, and requires a direct line-of-sight infrared connection. The remote control has a first infrared remote control group 1 for power control, that has of ON, OFF, AUTO and RESET 4 keys for simple ON, OFF and AUTO for default automatic Photo sensor enabled, and RESET for Photo sensor disable functions. The remote control has a second infrared remote control group for motion detector PIR sensor sensitivity control with 20%, 50%, 75% and default 100% sensitivity 4 keys for motion detection range adjustments. The remote control has a third remote control group for motion detector PIR Standby time control having 10 SEC, 1 MIN, default 5 MIN, 15 MIN, 30 MIN and 60 MIN 6 keys for motion detection Standby time adjustments.

The remote control has a fourth remote control group for ambient light level threshold control with default Minimum MIN, 10 LUX, 30 LUX, 50 LUX and Learning 5 keys for Photo sensor adjustments. The remote control has a fifth infrared remote control group for Dimming level control, with 0, 10%, default 20% and 30% 4 keys for Dimming level adjustment. The remote control has a sixth remote control group for dimming time control with 24 H, 1 MIN, 30 MIN and default 60 MIN, which are four buttons for dimming time adjustment. The remote control has a seventh remote control group for quick test with a TEST key for quick test of motion PIR sensor functions.

DETAILED DESCRIPTION OF THE PREFERRED EMBODIMENT

Figure 1:
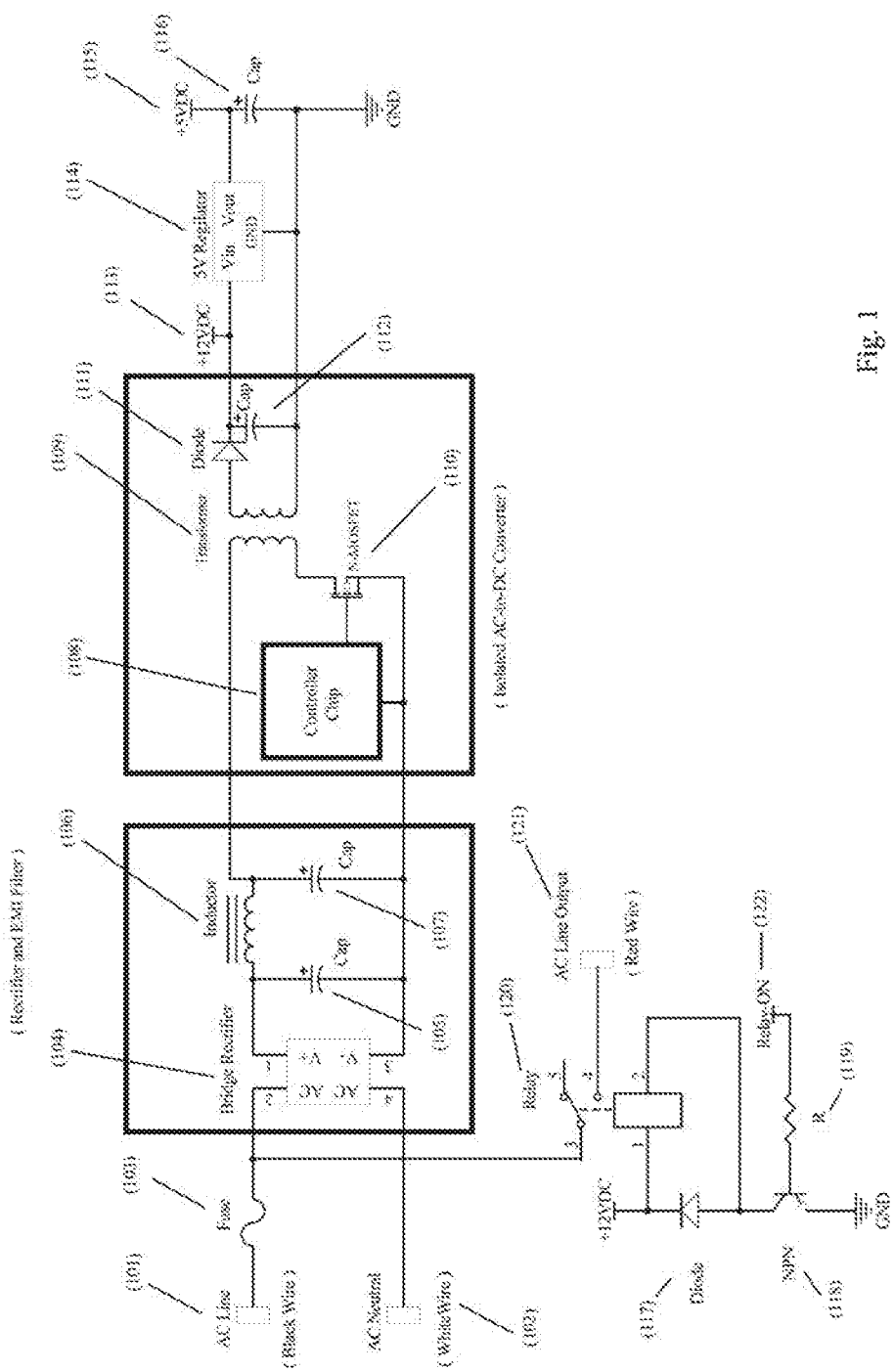
FIG. 1 is a circuit diagram of the AC input section, with a low power AC-to-DC converter, and the lighting output control mechanical relay.

AC input, AC-to-DC converter and output relay: The AC Line (101) input wire goes through Fuse (103) for over current protection, then it is connected to Bridge Rectifier (104) on the AC input pin. The AC Neutral (102) is connected to Bridge Rectifier (104) on the other AC input pin. The rectified high voltage DC is filtered by a "Pi" Filter consists of a Capacitor (105), an Inductor (106) and another Capacitor (107), to reduce harmful Electro-Magnetic Interference (EMI). This is the simplified "Rectifier and EMI Filter" section in FIG. 1.

The filtered high voltage DC is fed to the "Isolated AC-to-DC Converter" section, with simplified components of a Controller Chip (108), a N-Channel MOSFET (110), an Isolated Transformer (109), a secondary side Rectify Diode (111) and an output filtering capacitor (112). The AC-to-DC Converter output +12 VDC (113) is fed to a linear 5V Regulator (114), and generated +5 VDC (115) with a filtering capacitor Cap (116).

After the AC Line (101) power source is passed through Fuse (103), it is connected to the power input terminal of a mechanical Relay (120). This Relay's activation coil is driven by the +12 VDC (113) power source and a Transistor NPN (118), controlled by an output port P0.0 on pin-19 signal named Relay-ON (122) from the main control Microcontroller (201) via a current limiting base resistor R (119). The Relay's coil is connected in parallel with a Diode (117) to shunt the high spike voltage to protect the circuitry when the coil's current is turned off.

Figure 2:
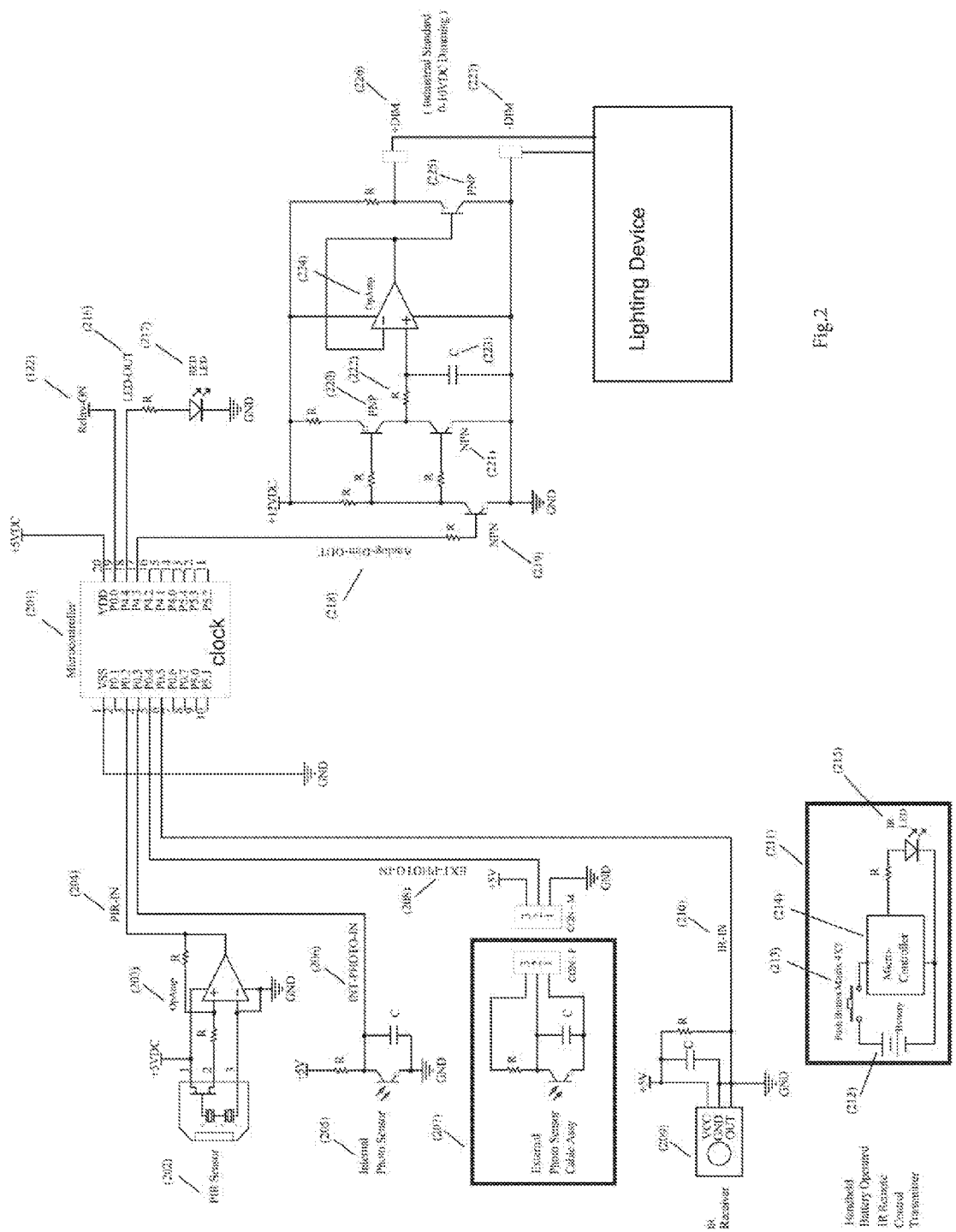
FIG. 2 is a circuit diagram that shows the sensors input signals, Microcontroller and output control signals.
Figure 3:
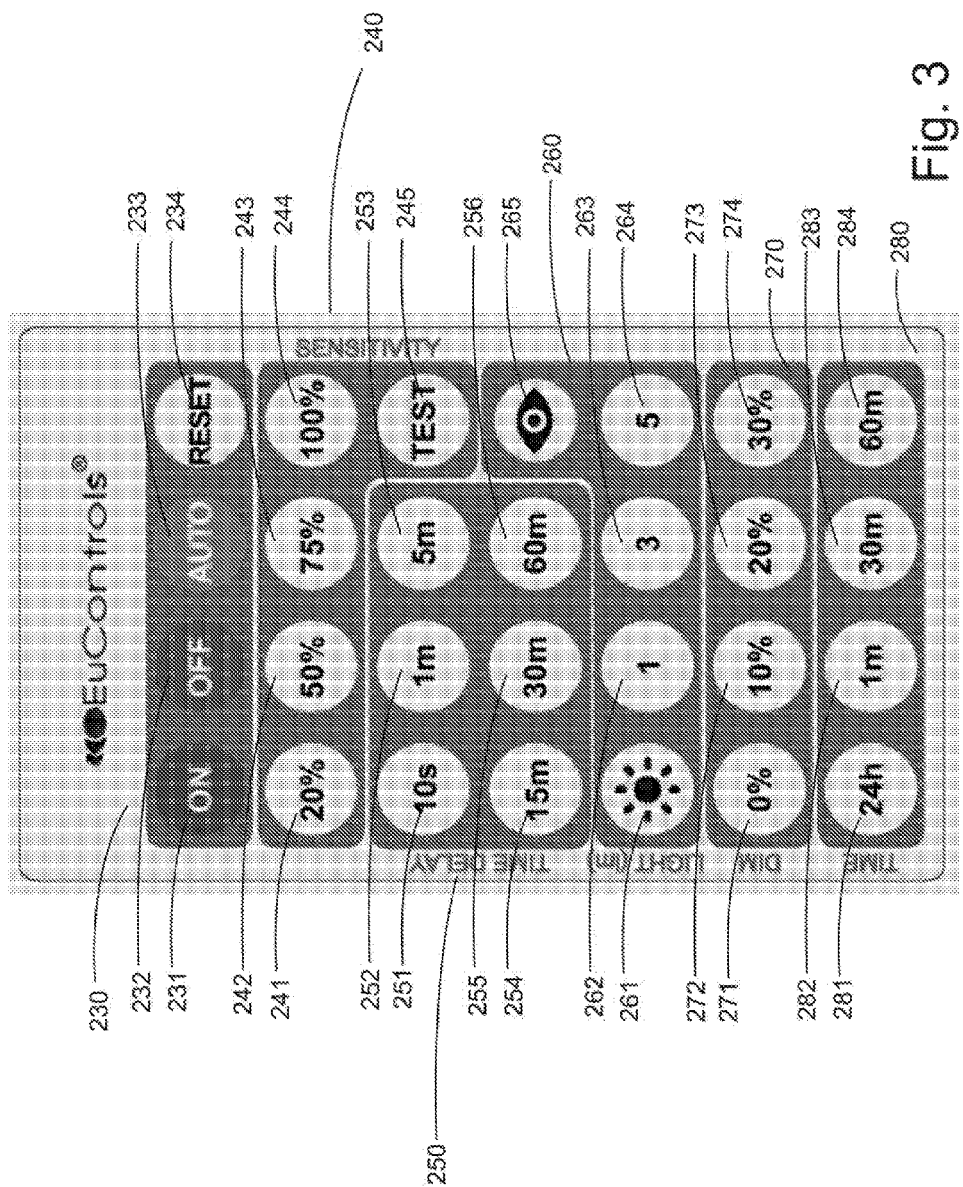
FIG. 3 is a diagram showing a top surface of the battery operated IR remote control S618RC The following call out list of elements can be a useful guide in referencing the element numbers of the drawings.
101 AC Line
102 AC Neutral
103 Fuse
104 Bridge Rectifier
105 Capacitor
106 Inductor
107 Capacitor
108 Controller Chip
109 Isolated Transformer
110 N-Channel MOSFET
111 Rectify Diode
112 Output Filtering Capacitor
113 AC-to-DC Converter Output +12 VDC
114 Linear 5V Regulator
115 +5 VDC
116 Filtering Capacitor Cap
117 Diode
118 Transistor NPN
119 Limiting Base Resistor R
120 Mechanical Relay
121 AC Line Output
122 Relay-ON
201 Microcontroller
202 Passive Infrared (PIR) Sensor
203 Operational Amplifier OpAmp
204 PIR-IN
205 Internal Photo Sensor
206 INT-PHOTO-IN
207 External Photo Sensor
209 Infrared (IR) Receiver
210 IR-IN
211 IR Remote Control Block Diagram
212 Battery
213 Push Button Matrix 4×7 for 28 Keys
214 Microcontroller
215 IR LED
216 LED-OUT
217 RED LED
218 Analog-Dim-OUT
219 Transistor NPN
220 Transistor PNP
221 Transistor NPN
222 Resistor R
223 Capacitor C
224 OpAmp
225 Transistor PNO
226 Dimming Positive Wire or +DIM
227 Diming Negative Wire or –DIM
230 power control buttons
231 on button
232 off button
233 auto button
234 reset button
240 sensitivity control buttons
241 sensitivity 20% button
242 sensitivity 50% button
243 sensitivity 75% button
244 sensitivity 100% button
245 sensitivity test button
250 time delay control buttons
251 time delay 10 second button
252 time delay one minute button
253 time delay five minute button
254 time delay 15 minute button
255 time delay 30 minute button
256 time delay 60 minute button
260 ambient light setting threshold control button group
261 sun button
262 single lumen button
263 three lumen button
264 five lumen button
265 eye button
270 dimming setting level button group
271 dimming setting zero button
272 dimming setting 10% button
273 dimming setting 20% button
274 dimming setting 30% button 280 set dimming time delay button control group
281 24 hour button
282 one minute button
283 30 minute button
284 60 minute button

The dual sensor lighting control system outputs the AC Line Output (121) to supply the lighting devices (Incandescent lamps, LED lighting fixtures or Fluorescent lamps) AC Line input power source. FIG. 2 shows a variety of sensor input signals, microcontroller and output control signals. The microcontroller (201) with proprietary firmware is the core of the sensor lighting control system. The microcontroller (201) runs on +5 VDC power source and processes the four input signals from the Passive Infrared (PIR) sensor (202), internal Photo Sensor (205), external Photo sensor (207) and Infrared (IR) Receiver (209), then outputs three signals, namely the Relay-ON (122), LED-OUT (216) and Analog-Dim-OUT (218) according to the preprogrammed firmware.

The PIR sensor (202) also uses a +5 VDC power source. The output is amplified by the Operational Amplifier OpAmp (203), (simplified circuitry shown) then the output signal named PIR-IN (204) is fed to an input port P0.2 on pin-3 of the Microcontroller (201). The internal Photo sensor (205) uses the +5 VDC power source. The output signal named INT-PHOTO-IN (206) connects to an input port P0.3 on pin-4 of the Microcontroller (201).

The external Photo sensor (207) has a case and cable assembly, with a 3-pin female connector. A mating 3-pin male connector is mounted on the S618-P-DR plastic housing, with +5 VDC, ground and the output signal named EXT-PHOTO-IN which is fed to an input port P0.4 on pin-5 of the Microcontroller (201).

The IR Receiver (209) runs on the +5 VDC power source. The output signal named IR-IN (210) is fed to an input port P0.5 on pin-6 of the Microcontroller (201). The remote control S618RC is a handheld battery operated IR remote control transmitter. This IR remote control block diagram (211) shows internal components of Battery (212), push button matrix 4×7 for 28 keys (213), Microcontroller (214) and IR LED (215). The Relay (120) control signal Relay-ON (122) comes from an output port P0.0 on pin-19 of the Microcontroller (201). The RED LED (217) control signal LED-OUT (122) comes from an output port P4.4 on pin-18 of the Microcontroller (201).

The 0-10 VDC dimming control signal Analog-Dim-OUT (218) comes from an output port P4.3 on pin-17 of the Microcontroller (201). The Analog-Dim-OUT (218) is a Pulse Width Modulation (PWM) signal buffered by Transistor NPN (219), and then driven by push-pull configuration Transistor PNP (220) and Transistor NPN (221). This PWM signal is integrated by resistor R (222) and capacitor C (223) into a DC voltage. This DC voltage is buffered by OpAmp (224) in "unit gain" configuration. The output of OpAmp (224) is further buffered by Transistor PNP (225) in "emitter follower" configuration. The Transistor PNP (225) output on Emitter Electrode is the 0-10 VDC dimming positive wire, or +DIM (226). The 0-10 VDC dimming negative wire, or −DIM (227) is simply the system ground.

The sensor lighting control has numerous lighting control operations. Without using the 1-button IR remote control S618RC, the sensors lighting control system S618-P-DR can work on the factory default settings, or the previously setting programmed by the 1-button IR remote control S618RC.

The following description begins with the factory default settings assuming no previous programming using the 1-button IR remote control S618RC. Later, the description discusses the operation of the 1-button IR remote control S618RC for changing the settings.

At initial power up, the Relay-ON (122) signal is set high at logic 1, or 5V. The Relay (120) coil is activated and the AC Line power is fed to the AC Line Output (121) to power up the lighting devices connected to the system. The Analog-Dim-OUT (218) signal is at 100% PWM, or continuous at +5 VDC. The 0-10 VDC dimming signal between +DIM (226) and −DIM (227) is at a maximum 10 VDC. If the connected lighting device has 0-10 VDC dimming input wires and are connected to +DIM (226) and −DIM (227), the lighting device will be at the maximum luminance.

Without intervention of the IR remote control S618RC, the lighting device starts in the default "AUTO" mode, which will set other default settings—"Sensitivity" as 100%, "Standby time" as 5 minutes, "LUX" as minimum, "Dimming level" as 20% and "Dimming time" as 60 minutes.

The default "AUTO" operation will turn ON the lighting device output with maximum intensity with 10 VDC output on the 0-10 VDC dimming wires. The PIR sensitivity is set at maximum range with maximum sensitivity at 100%. The "Stand-by time" is set at five minutes. If PIR senses or detects any motions, the "Stand-by time" will be reset to 5 minutes again to avoid lighting interruption such as if the lighting devices were dimmed or turned OFF. When the PIR sensor detects no motion for continuous 5 minutes, the lighting devices are set to the default dimming level of 20% (equivalent 2 VDC on the dimming wires). Then, the lighting devices have a default dimming time of 60 minutes. When the PIR sensor does not detect motion detected within continuous 60 minutes, then the lighting device will be turned full OFF. However, if the PIR sensor detects motion during the dimming time period of 60 minutes, then the lighting device is turned full ON, and the stand-by time is reset to 5 minutes. Then the same process will restart again.

However, the IR remote control S618RC can be used to change the current status, or the programmable settings other than the default as described in the next portion of this description.

The infrared remote control has a variety of one button control functions that are activated by a single button press. This is different than a variety of multiple sensor lighting control systems currently on the market that have complicated programming procedures to setup and alter the default settings to fit customers' specific applications. The complicated procedures are almost impossible for common users to memorize, unless they are used frequently on the daily or weekly. The complex procedures are very intimidating to most customers and not practical for users to change the setting only once a while. They are programmed into wrong settings very often, and the users have to read the programming guides and relearn them almost every time.

The present invention eliminates the complex programming procedure. Only the most common programming procedures are necessary. The applicant has modified the S618 system (S618-P-DR and IR remote control S618RC) to incorporate a "1-button" programming technique, which is the core of the disclosed invention here.

The IR remote control functions are grouped into 7 categories. The power control buttons 230 provide power control on the top row of four buttons "ON", "OFF", "AUTO" and "RESET". The "ON" button 231 overrides other controls to turn on the light. Afterwards, the sensor returns to the previous state after 20 minutes if continuously uninterrupted by motion. The "OFF" button 232 overrides and turns off the light and keeps the light off. The sensor returns to the previous setting after 20 m if continuously uninterrupted by motion. The "AUTO" button 233 enables auto mode and provides for a default set of parameters where Sensitivity=100%, Standby Time Delay=5 m, Dimming Time Delay=24 h (none), Dimming Level=20%, and Ambient Light Threshold=5 lumens. The "RESET" button 234 resets the sensor to factory settings where Sensitivity=100%, Standby Time Delay=5 m, Dimming Time Delay=60 m, Dimming Level=20%, Ambient Light Threshold=disabled.

The sensitivity level setting control button set 240 is shown on the top second row and includes exactly four buttons, namely "20%", "50%", "75%" and "100%". The sensitivity level setting has four buttons and can set the PIR element detector sensitivity. The sensitivity 20% button 241 sets the sensitivity to 20%. The sensitivity 50% button 242 sets the sensitivity to 50%. The sensitivity 75% button 243 sets the sensitivity to 75%. The sensitivity 100% button 244 sets the sensitivity to 100%. The sensitivity test button 245 provides a test function. The test button 245 is on the third row right most button and labeled "TEST". The test button turns off a light if the light is already on, and then turns on the light on for a short time such as a second if motion is detected. Then the light is turned off and the process is repeated for 2 ms.

The remote control also includes a set of standby set time delay buttons 250 shown on the top third and fourth row left three buttons "10 s", "1 m", "5 m", "15 m", "30 m" and "60 m". The standby time delay buttons set the duration of time before an activated sensor dims a light once motion is no longer detected. The time delay 10 second button 251 sets the time delay for 10 seconds. The time delay one minute button 252 sets the time delay to one minute. The time delay five minute button 253 sets the time delay to five minutes. The time delay 15 minute button 254 sets the time delay to 15 minutes. The time delay 30 minute button 255 sets the time delay to 30 minutes. The time delay 60 minute button 256 sets the time delay to 60 minutes.

The ambient light setting threshold button control group 260 is shown on the top fifth row of four buttons including the "SUN", "1", "3", "5" and fourth row rightmost button "LEARN". The "SUN" button 261 is a symbol of the Sun. The "LEARN" button 265 is a symbol of an eye. The ambient light setting threshold is disabled when pressing the sun button and can be changed to 1, 3, or 5 lumens. The sun button 261 disables the ambient light setting threshold. The one lumen button 262 sets the ambient light setting threshold to one lumen. The 3 lumens button 263 sets the ambient light setting threshold to 3 lumens. The 5 lumens button 264 sets the ambient light setting threshold to 5 lumens. The eye button 265 learns an ambient light setting threshold which sets the ambient light setting threshold to the current ambient light setting such that the firmware is configured to keep the light levels at the current ambient light. If the ambient light is less than the learned ambient light setting threshold, the lights will turn on or increase in intensity. If the ambient light is greater than the learned ambient light setting threshold, the lights will turn off or dim. The detection cut off can be changed by a single button press.

The dimming setting level button group 270 provides a sixth row of four buttons "0", "10%", "20%" and "30%". The dimming setting zero button sets the dimming level to zero. The dimming setting 10% button 272 sets the dimming setting to 10%. The dimming setting 20% button 273 sets the dimming setting to 20%. The dimming setting 30% button 274 sets the dimming setting to 30%. The light dimming level can after time delay has passed (sensor dims light to save energy).

The set dimming time delay button control group 280 is configured on the seventh row of four buttons including "24 h", "1 m", "30 m" and "60 m". The 24 hour button 281 sets the dimming time delay to 24 hours so that the light is dimmed down for a total of 24 hours before turning off completely. The one minute button 282 sets the dimming time delay to one minute so that the light is dimmed down for a total of 24 hours before turning off completely. The 30 minute button 283 sets the dimming time delay to 30 minutes so that the light is dimmed down for a total of 30 minutes before turning off completely. The 60 minute button 284 sets the dimming time delay to an hour so that the light is dimmed down for a total of one hour before turning off completely.

The invention claimed is:
1. A dual sensor lighting controller comprising:
  a. an AC input rectifier that includes an EMI filter, and an isolated AC-to-DC converter for 12 VDC and 5 VDC supplies, and a mechanical relay to control output AC Line voltage for the lighting device, wherein AC input rectifier is electrically connected to the isolated AC-to-DC converter, wherein the mechanical relay is electrically connected to the output AC line voltage;
  b. a motion PIR sensor;
  c. an internal photo sensor;
  d. an external photo sensor;
  e. an infrared receiver configured to receive signals from a remote control, wherein the remote control is a handheld battery operated infrared remote control;
  f. 2-wires 0-10 VDC dimming; and
  g. a microcontroller with firmware controls, wherein the microcontroller is electrically connected to the internal photo sensor, the external photo sensor, and the motion PIR sensor, wherein the 2-wires 0-10 VDC dimming is electrically connected to the microcontroller.

2. The dual sensor lighting controller of claim 1, wherein the microcontroller reads PIR, internal or external photo sensors signals, wherein the microcontroller has a clock that counts internal timing to control an output of the lighting device by a mechanical relay together with 0-10 VDC dimming control to save electrical energy by activating or deactivating the output AC line voltage.

3. The dual sensor lighting controller of claim 1, wherein the microcontroller is connected to and reads the infrared signal received from the infrared receiver and interpret the received infrared signal.

4. The dual sensor lighting controller of claim 1, wherein the remote control has seven groups of commands, namely: power control, motion detector PIR sensitivity control, motion detector PIR standby time control, ambient light threshold control, dimming level control, dimming time control, quick test control.

5. The dual sensor lighting controller of claim 1, wherein the remote control has 28 buttons in a 4×7 grid.

6. The dual sensor lighting controller of claim 1, wherein the remote control operates with a narrow beam angle less than five degrees, and requires a direct line-of-sight infrared connection.

7. The dual sensor lighting controller of claim 1, wherein the remote control has a first infrared remote control group 1 for power control, that consists of ON, OFF, AUTO and RESET which are 4 buttons for simple ON, OFF and AUTO for default automatic photo sensor enabled, and RESET for photo sensor disable functions.

8. The dual sensor lighting controller of claim 7, wherein the remote control has a second infrared remote control group for motion detector PIR sensor sensitivity control consists of 20%, 50%, 75% and 100% sensitivity which are 4 buttons for motion detection range adjustments wherein 100% is default value for motion detection range adjustment.

9. The dual sensor lighting controller of claim 8, wherein the remote control has a third remote control group for motion detector PIR standby time control consists of 10 SEC, 1 MIN, 5 MIN, 15 MIN, 30 MIN and 60 MIN which are 6 buttons for motion detection Standby time adjustments wherein 5 MIN is default value for motion detection range adjustment.

10. The dual sensor lighting controller of claim 9, wherein the remote control has a fourth remote control group for ambient light level threshold control for photo sensor adjustments.

11. The dual sensor lighting controller of claim 10, wherein the remote control has a fifth infrared remote control group for Dimming level control, consists of 0%, 10%, 20% and 30% which are 4 buttons for Dimming level adjustment wherein 20% is default value for motion detection range adjustment.

12. The dual sensor lighting controller of claim 11, wherein the remote control has a sixth remote control group for dimming time control consisting of 2411, 1 MIN, 30 MIN and 60 MIN, which are four buttons for dimming time adjustment wherein 60 MIN is default value for motion detection range adjustment.

13. The dual sensor lighting controller of claim 12, wherein the remote control has a seventh remote control group for quick test consists of a TEST button for quick test of motion PIR sensor functions.

\* \* \* \* \*